United States Patent [19]

Norberg

[11] 4,041,455
[45] Aug. 9, 1977

[54] INTERROGATION AND MONITORING SYSTEM

[75] Inventor: Gayle Russell Norberg, Columbia Heights, Minn.

[73] Assignee: Control Data Corporation, Minneapolis, Minn.

[21] Appl. No.: 710,989

[22] Filed: Aug. 2, 1976

[51] Int. Cl.² .................. G06F 11/00; G08B 29/00
[52] U.S. Cl. .................. 340/146.1 C; 340/213.1; 340/408
[58] Field of Search .................. 340/146.1 C, 152 R, 340/152 T, 213 R, 408; 235/153 AK, 153 A

[56] References Cited

U.S. PATENT DOCUMENTS

| 3,245,066 | 4/1966 | Mattlet | 340/146.1 C |
| 3,670,303 | 6/1972 | Dame | 340/146.1 C |
| 3,859,624 | 1/1975 | Kriofsky et al. | 340/408 |

Primary Examiner—Charles E. Atkinson
Attorney, Agent, or Firm—Robert M. Angus

[57] ABSTRACT

A monitoring system for monitoring individual modules includes a central station and a plurality of remote modules connected to said central station by a data channel. Each remote module includes a switch responsive to a fault condition for connecting a passive circuit to said data channel. The central station supplies a monitor signal to which the passive circuit is responsive to supply a fault signal. The central station includes a monitor responsive to the fault signal for impressing an interrogation signal onto the data channel to which the passive circuit is responsive to supply a coded signal indicative of the particular module responding to the fault condition.

13 Claims, 7 Drawing Figures

INTERROGATION AND MONITORING SYSTEM

This invention relates to monitoring systems, and particularly apparatus for monitoring remote apparatus of a computer system and communicating malfunctions in such remote apparatus to a central system.

Data processing systems ordinarily employ several modular units each having their own power supplies, interconnected by data channels for transmitting data between selected units. One problem associated with modular data processing systems resides in the fact that environmental crises and hardware disruptions in the systems may have a deleterious effect on operating software, and can create errors in the data processing operations. Accordingly, it is desirable that such crises and disruptions be detected quickly so that appropriate corrective meansures may be taken with a minimum of disruption to the overall system. However, due to the modularity of such data processing systems, any monitor and communication system must be extremely flexible in configuration. Furthermore, the monitoring system must be electromagnetically isolated from the modules being monitored to prevent a conduction or radiation interference with the devices being monitored.

Heretofore, data processing monitors have employed hard-wired networks of sensors and relays. However, such devices have proven to be extremely inflexible, electrically noisy, and may themselves have a deleterious effect on the modules being monitored.

The present invention is concerned with a passive communication and interrogation system wherein a passive signaling circuit is associated with each monitored unit, and each is capable of responding to an interrogation signal with a unique signal indicative of the unit causing a malfunction.

It is an object of the present invention to provide an interrogation system utilizing passive signaling elements which provide information as to the status of a monitored unit.

Another object of the present invention is to provide an interrogation system for monitoring remote devices utilizing passive signaling elements capable of bypassing any remote unit not part of the system.

Another object of the present invention is to provide a passive communication and interrogation system having a high degree of flexibility for use in monitoring data processing equipment.

In accordance with the present invention, a central station is coupled to a suitable communication channel and includes an interrogator and a monitor. Data processing modules, ordinarily associated with a data processing system include suitable detectors and sensors for detecting and sensing malfunctions of the individual module. These sensors and detectors are capable of operating on the communication channel of the interrogation system so as to cause operation of an associated passive circuit which, when interrogated by the interrogator of the central station will reflect a signal back to the monitor of the central station indicative of the condition of the monitored data processing module.

One feature of the present invention resides in the provision of apparatus for switching the passive circuit associated with any particular module out of the interrogation system, thereby providing flexibility to the data processing system and the associated interrogation system.

Another feature of the present invention resides in the provision of passive circuits which may be selectively wired in the field to provide unique signal responses to an interrogation signal from the central station.

It is yet another feature of the present invention to provide specific circuitry for an interrogation and monitoring system utilizing passive circuits for each device being monitored.

The above and other features of the invention will be more fully understood from the following detailed description and the accompanying drawings in which.

Figure 1:
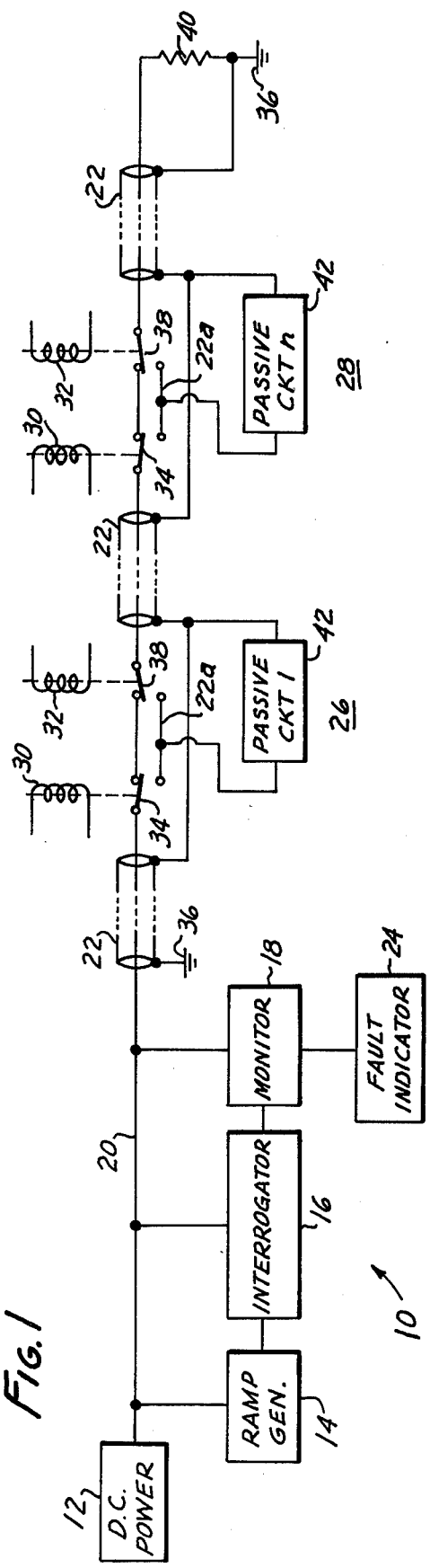
FIG. 1 is a block circuit diagram of an interrogation and monitoring system in accordance with the presently preferred embodiment of the present invention.

Referring to the drawings, and particularly to FIG. 1, there is illustrated a central station 10 having a DC power supply 12, ramp generator 14, interrogator 16 and monitor 18 all connected to the center conductor 20 of a communication channel illustrated as a coaxial cable 22. Interrogator 16 is also connected directly to ramp generator 14 and to monitor 18, and fault indicator 24 is connected to monitor 18.

Coaxial cable 22 serially connects a plurality of stations illustrated generally at 26, 28. Each station includes a data processing module (not shown) having a plurality of sensors or detectors (not shown) for detecting and sensing environmental changes (e.g. temperature, humidity, pressure, etc.) and/or circuit disruptions (e.g. power failure, circuit faults, and errors in program, etc.). Each detector and/or sensor is capable of operating the coil 30 of a solenoid. A second coil 32 of a solenoid is illustrated for use with a detector or sensor (not shown) associated with a power failure or power disconnect (which may or may not be a fault condition), of the module.

The pole 34 of the solenoid associated with coil 30 is connected directly to condutor 20 of cable 22. As illustrated particularly in the drawings, the other conductor of cable 22 is connected directly to ground illustrated generally at 36. Likewise, pole 38 associated with coil 32 is connected to conductor 20, so that when coils 30 and 32 are activated so as to hold the poles in the position illustrated in FIG. 1, conductor 20 provides a continuous path through the stations 26, 28 to terminate at termination resistor 40, connected between conductor 20 and ground 36. The second, or deactivated, position of poles 34, 38 are connected together and to one side of passive circuit 42. The opposite side of the passive circuit 42 is connected to the ground side of cable 22.

Figure 2:
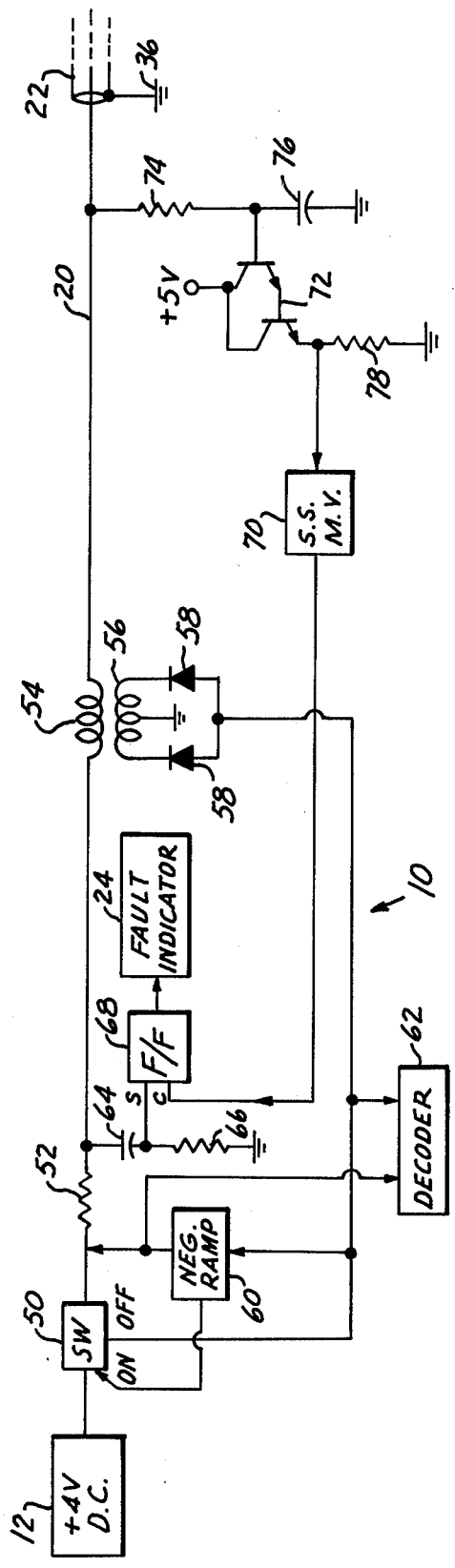
FIG. 2 is a block circuit diagram of the central station of the system illustrated in FIG. 1.

With reference to FIG. 2, the details of the central station may be readily explained. Central station 10 includes a DC power supply 12 capable of supplying a DC voltage, for example + 4 v. to switch 50. Switch 50 is connected through resistor 52 and coil 54 to conductor 20 of cable 22. Coil 54 is electromagnetically connected to coil 56 whose center tap is connected to ground and whose ends are connected through diodes 58 to negative ramp generator 60, decoder 62 and to the off side of switch 50. When activated, negative ramp generator 60 provides a negative ramp signal to conductor 20 through resistor 52 and coil 54. Also, negative ramp generator 60 is connected to the on side of switch 50 and to the decoder 62. A filter comprising capacitor 64 resistor 66 has an input connected to the set side of flip-flop 68 which in turn is connected to fault indicator 24. The clear side of flip-flop 68 is connected to single-shot multivibrator 70, which in turn gets its input from amplifier pair 72 connected to the junction between resistor 74 and capacitor 76. A suitable clamping resistor 78 is connected to the input of single-shot multivibrator 70.

Figure 3:
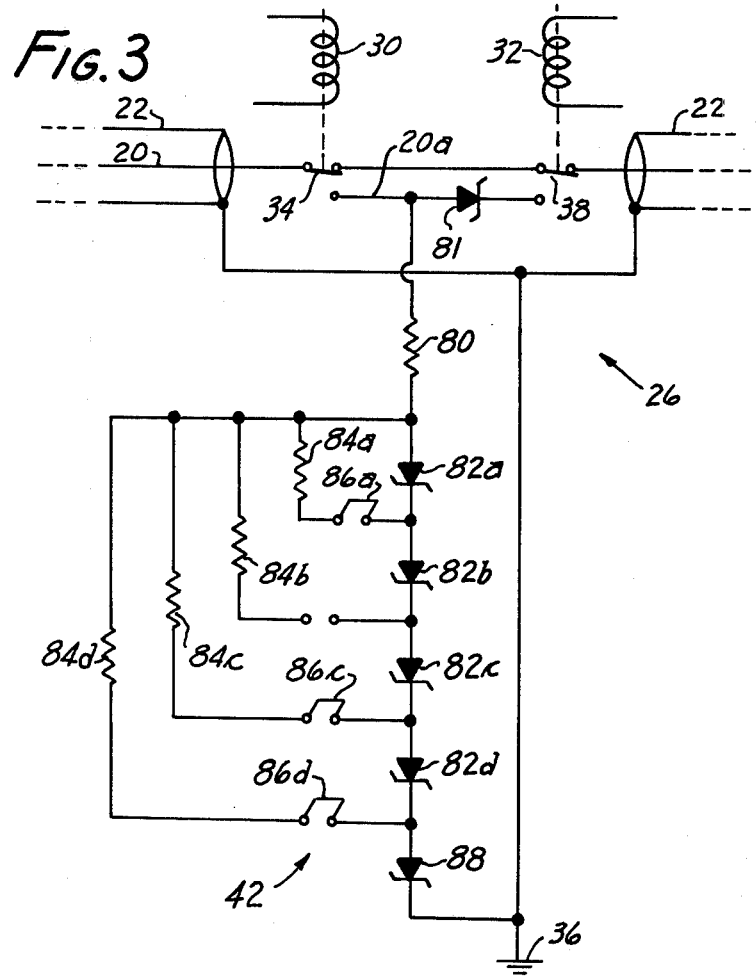
FIG. 3 is a circuit diagram of a passive circuit associated with a monitored unit for inclusion in the apparatus illustrated in FIG. 1.

With reference to FIG. 3, there is illustrated a passive signaling circuit in accordance with the presently preferred embodiment of the present invention. Circuit 42, which may be part of monitored station 26 (having solenoid coils 30, 32 and contacts 34, 36 as heretofore described), includes a resistor 80 connected to conductor 20a and connected to the series arrangement of Zener diodes 82a, 82b, 82c and 82d. Each diode 82 is shunted by a suitable resistor 84a, 84b, 84c and 84d connected in shunt by a suitable shunt circuit 86a, 86c and 86d. Note, however, there is no shunt 86b providing a shunt circuit for resistor 84b. Zener diode 88 connects the serial arrangement to ground 36, which in turn is connected to the shielded portion of cable 22. Zener diode 81 is connected between the open poles of contacts 34 and 38 (when solenoids 30 and 32 are activated).

Figure 4:
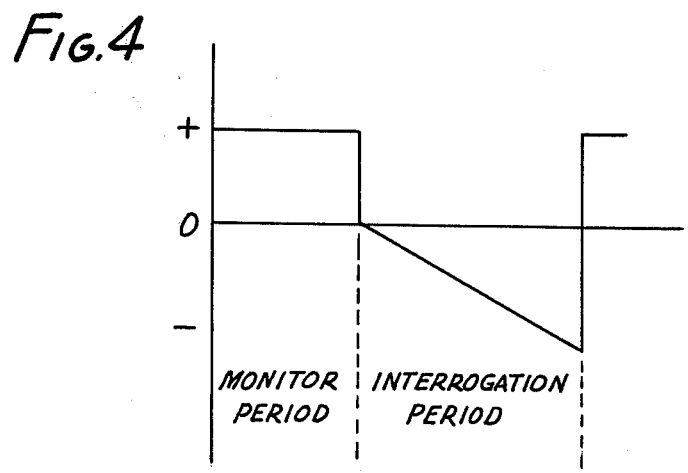
FIG. 4 is an illustration of a waveform useful in the explanation of the apparatus illustrated in FIGS. 1-3.

With reference to FIG. 4 and to the circuit illustrated FIGS. 1-3, let it be assumed that the circuit is in its monitor period as illustrated in FIG. 4, such that switch 50 is in its on position thereby connecting supply 12 to conductor 20. Termination resistor 40 and resistor 52 are approximately equal to the surge impedance of line 20. Hence, about one-half of the voltage drop from the supply 12 appears across termination resistor 40. When a fault occurs, thereby deactivating one of coils 30 (FIG. 3), the supply voltage from supply 12 is disconnected from termination resistor 40, and thereafter is connected to conductor 20a of the passive circuit 26 thereby briefly interrupting the current in line 20 and causing a voltage spike at the central station (FIG. 1) for reception through the filter formed by capacitor 64 and resistor 66 to set flip-flop 68 to thereby set fault indicator 25 to indicate a fault. At the same time, a voltage spike is reflected through coil 54 to coil 56 thereby operating switch 50 to its off position and to set negative ramp generator 60 to commence a negative ramp interrogation signal.

Ramp 60 commences a negative ramp illustrated as the interrogation portion of the waveform of FIG. 4, which is applied through resistor 80 and Zener diode 82a to cause a current step to be generated upon the breakdown of diode 82a to be reflected back onto conductor 20, and differentiated through transformer 54, 56 as a binary one. As the voltage from negative ramp generator becomes more negative, diode 82b will break down through resistor 84a, causing a second binary one to be generated. Due to the open connection of resistor 84b, upon further negative swing of the ramp voltage, the breakdown of diode 82c does not reflect a current step onto line 20. However upon further negative swing of the ramp voltage, diode 82d breaks down reflecting a step current through resistor 84c and upon further negative swing of the ramp, diode 88 breaks down reflecting a step through resistor 84d. Thus, it is apparent that the breakdown of the Zener diodes coupled with the unique connection of the parallel resistors generates a unique code for passive circuit 42 indicative of a binary 11011.

The signals or current steps from the passive circuit are transmitted to the central station and received by coil 54, differentiated and transferred via coil 56 to decoder 62 which, by comparison of each with the elapsed time of the ramp from voltage generator 60, determines the binary code and the identification of the unit having malfunction. In the event that the malfunctioned unit is subsequently shut off, coil 32 is deactivated thereby allowing its pole 38 to be connected to conductor 20a to reconnect the coaxial cable to downstream units via conductor 20a and Zener diode 81. Zener diode 81 passes positive voltages without significant attenuation, but produces an offset of DC voltages (and hence, time) of responses from downstream units so they can be clearly distinguished by decoder 62 from those still connected passive circuits 42 by the units shut down.

Upon completion of the interrogation period, negative ramp generator 60 operates switch 50 to its on position to re-establish a plus DC voltage to the line. As the voltage on line 20 swings through zero volts, the filter established by resistor 74 and capacitor 76 operates amplifier pair 72 to operate single-shot multivibrator 70 which, after a suitable delay, operates the clear side of flip-flop 68 to clear fault indicator 24. Thus, the process is ready to begin anew.

Figure 5:
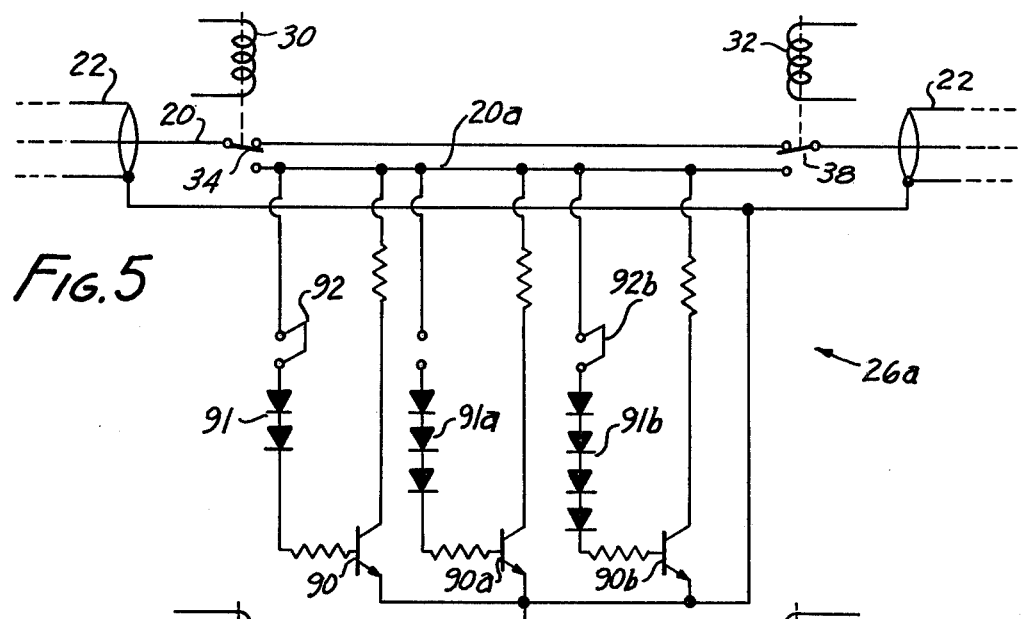
FIGS. 5-7 are circuit diagrams of modified passive circuits useful in the apparatus illustrated in FIG. 1.

With reference to FIG. 5, a modified version of a passive circuit 26a is illustrated. Circuit 26a operates on much the same principle as the circuit illustrated in FIG. 3 except that it includes a transistor switch 90, 90a, 90b each connected through a resistor in the base circuit to a plurality of breakdown diodes 91 connected via a shunt 92, 92b to conductor 20a. The emitter of each transistor 90 is connected to ground 36 while the collector of each transistor 90 is connected through a suitable resistor to conductor 20a. In operation of the circuit illustrated in FIG. 5, during the ramp voltage, the series of breakdown diodes 91, 91a, 91b will break down at different levels in the voltage ramp, thereby producing a unique amplified step current output from the respective transistor onto conductor 20a to be reflected to the monitor circuit. Due to the open circuit in the base circuit of transistor 90a, no reflection will occur at the voltage at which diode 91a would normally break down.

Figure 6:
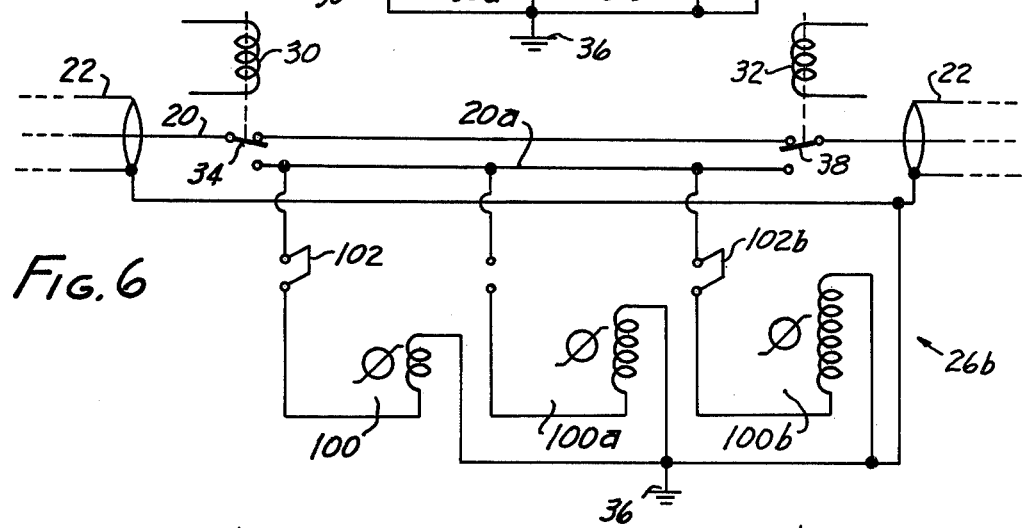

With reference to FIG. 6, there is illustrated another modification of passive circuit responsive to a ramp current in accordance with the present invention wherein a plurality of switch cores 100, 100a and 100b are connected in parallel to conductor 20a. The winding of each switch core has a different number of turns as illustrated in FIG. 6 so that each will respond to a different current level to switch, thereby generating a current spike indicating a binary one. However, the shunt conductors 102, 102b connect selected switch cores into the circuit thereby providing a unique binary pattern for reflection onto conductor 20.

Figure 7:
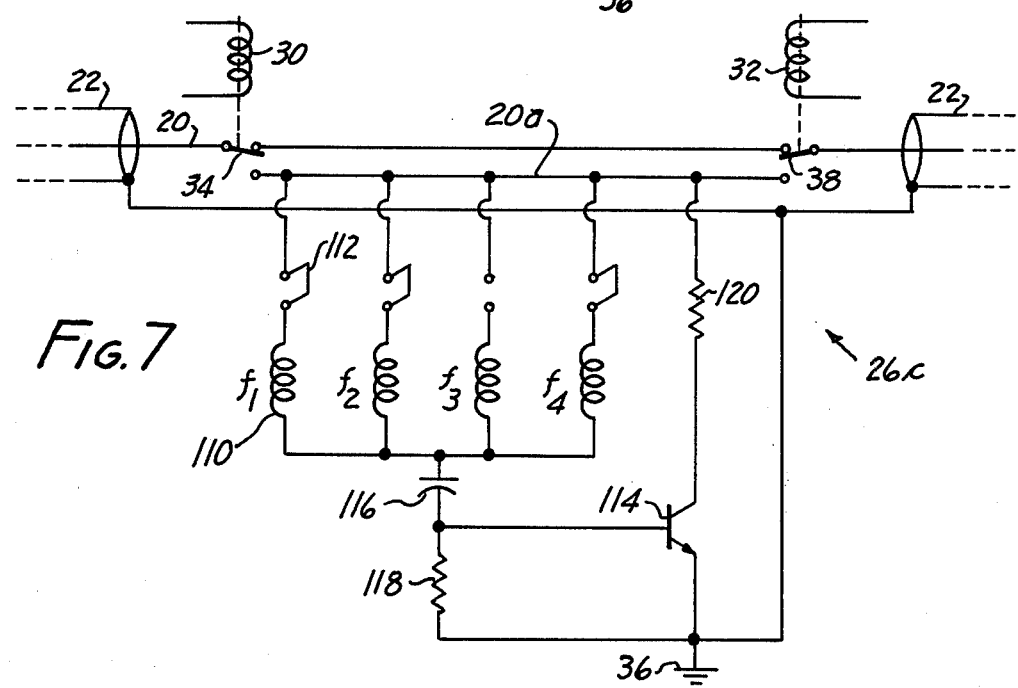

FIG. 7 illustrates yet another modification of a passive circuit in accordance with the present invention. In this case, however, instead of utilizing a ramp voltage as the source of interrogation signals, a signal source of varying frequency is utilized and the passive circuit is responsive to various frequencies to generate binary coded signals onto conductor 20. Thus, a plurality of coils 110 are connected in parallel through suitable shunts 112 to conductor 20a to provide an input to the base of transistor 114 through capacitor 116. Resistor 118 provides a connection between base and emitter of transistor 112, the emitter being connected to ground 36. The collector of transistor 114 is connected through resistor 120 to conductor 20a. As the frequency of the signal from the central station increases or decreases in time in a predetermined manner, each coil 110 operates transistor 114 in sequence to produce a current rise on conductor 22 for reflection to the monitor circuit (FIG. 2) thereby producing a binary one. However, the selected coil 110 not connected to conductor 20a via a shunt 112 produces no binary one. Hence, the circuit provides a unique binary pattern to be transmitted to the monitor circuit. In this case, as the frequency increases linearly with time, the current response need not be differentiated to produce spikes, so the monitor circuit may be correspondingly simplified.

The present invention thus provides a monitor circuit capable of monitoring and interrogating the condition of monitored units, and is particularly useful in a modular data processing system for ready determination of the malfunctioned module to permit repair of the module. The apparatus is effective in use and requires no independent source of power from the monitored units. Consequently, the apparatus has little effect upon the operation of the device being monitored as it introduces virtually no transient signals to the monitored device and is sufficiently flexible to permit any number of devices to be monitored to be connected into the system.

This invention is not to be limited by the embodiments shown in the drawings and described in the description, which are given by way of example and not of limitation, but only in accordance with the scope of the appended claims.

What is claimed is:

1. A monitoring system for monitoring individual modules comprising, in combination:
    a central station including:
        supply means for supplying a monitor signal,
        interrogator means for supplying an interrogation signal,
        monitor means responsive to a fault signal for initiating operation of said interrogator means, and
        decode means responsive to a coded signal for indicating which of a plurality of modules initiated a fault signal;
    data channel means connected to said central station for carrying said monitor signal, interrogation signal, fault signal and coded signal; and
    a plurality of remote stations connected to said data channel means, each of said remote stations including:
        responder means, and
        switch means responsive to a fault condition in the respective module for connecting said responder means to said data channel means,
        said responder means including first circuit means responsive to said monitor signal for supplying said fault signal to said data channel means, and passive circuit means responsive to said interrogation signal for supplying said coded signal to said data channel means, the coded signal of each responder means being unique to each such responder means, whereby, upon the occurrence of a fault condition in a module, the data channel means is connected to the respective responder means and said respective responder means supplies a fault signal to said monitor means, whereupon said monitor means operates said interrogator means to supply said interrogation signal, and the respective responder means responds to interrogation signal to supply said coded signal indicative of the faulted module to said decode means.

2. Apparatus according to claim 1 wherein each of said remote stations includes second switch means responsive to an "off" condition of the respective module for bypassing the respective responder means.

3. Apparatus according to claim 1 wherein said interrogator means is a ramp generator and each of said responder means includes a plurality of passive circuit elements each adapted to reflect a transient signal onto said data channel means in response to a different signal level of said ramp generator.

4. Apparatus according to claim 3 wherein each of said responder means includes a like plurality of said passive circuit elements, one of said passive circuit elements of each responder means being responsive to one signal level, another of said passive circuit elements each responder means being responsive to another signal level, and disable means in selected ones of said responder means for disabling selected ones of said circuit elements so that each responder means reflects one or more transient signals onto said data channel in a unique code for the respective responder means.

5. Apparatus according to claim 4 wherein each of said remote stations includes second switch means responsive to an "off" condition of the respective module for bypassing the respective responder means.

6. Apparatus according to claim 3 wherein said plurality of passive circuit elements of each of said responder means comprises a plurality of serially-arranged breakdown diodes, and a plurality of impedence means each arranged in parallel connection with selected ones of said diodes.

7. Apparatus according to claim 6 wherein each of said remote stations includes second switch means responsive to an "off" condition of the respective module for bypassing the respective responder means.

8. Apparatus according to claim 3 wherein said plurality of passive circuit elements of each of said responder means comprises a plurality of breakdown means each responsive to a different signal level from said ramp generator, said plurality of breakdown means being connected in parallel.

9. Apparatus according to claim 8 wherein each of said remote stations includes second switch means responsive to an "off" condition of the respective module for bypassing the respective responder means.

10. Apparatus according to claim 3 wherein said ramp generator generates a current ramp and wherein said plurality of passive circuit elements of each of said responder means comprises a plurality of current switch means each responsive to a different current level, said plurality of current switch means being connected in parallel.

11. Apparatus according to claim 10 wherein each of said remote stations includes second switch means responsive to an "off" condition of the respective module for bypassing the respective responder means.

12. Apparatus according to claim 1 wherein said interrogator is a frequency generator for generating a signal whose frequency varies linearly with time, and each of said responder means includes a plurality of frequency responsive means each adapted to reflect a transient signal onto said data channel in response to a different frequency.

13. Apparatus to claim 12 wherein each of said remote stations includes second switch means responsive to an "off" condition of the respective module for bypassing the respective responder means.

* * * * *